Aug. 2, 1955    C. E. NELSON    2,714,319
TEAT CUP REVERSING TOOL
Original Filed Sept. 13, 1949

Carl E. Nelson
INVENTOR.

BY *Clarence A. O'Brien
and Harvey B. Jacobson*
Attorneys

United States Patent Office 2,714,319
Patented Aug. 2, 1955

2,714,319

TEAT CUP REVERSING TOOL

Carl E. Nelson, Colfax, Wis.

Substituted for abandoned application Serial No. 115,538, September 13, 1949. This application June 4, 1954, Serial No. 434,601

3 Claims. (Cl. 81—3)

The present invention relates to new and useful improvements in tools for reversing or turning a teat cup inside out for the inspection thereof, the instant application being a substitute for my abandoned application Serial No. 115,538.

It is frequently necessary to inspect teat cups used in milking machines and since these cups are constructed of substantially stiff rubber it is difficult to turn the cups inside out for exposing and inspecting the interior thereof.

Accordingly, it is an object of the present invention to provide a tool by means of which the reversing or turning of the cup inside out may be easily accomplished.

A further object is to provide a tool of this character of simple and practical construction, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part thereof, wherein like numerals refer to like parts throughout, and in which:

Figure 1:
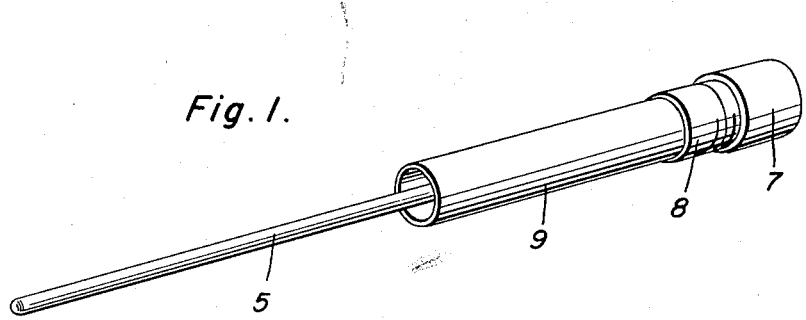
Figure 1 is a perspective view of the tool.

Referring now to the drawing in detail wherein for the purpose of illustration I have disclosed a preferred embodiment of the invention the numeral 5 designates a rigid metal rod welded or otherwise suitably secured at one end to the inside of an internally threaded cap 7. The cap 7 is threaded on one end of a sleeve or coupling 8 which in turn is suitably secured to one end of a relatively thin wall metal tube 9, such as by welding or threading the sleeve or coupling 8 thereon.

Rod 5 projects outwardly from the outer end of tube 9 and is supported centrally therein and forms a handle for the tool.

Figure 2:
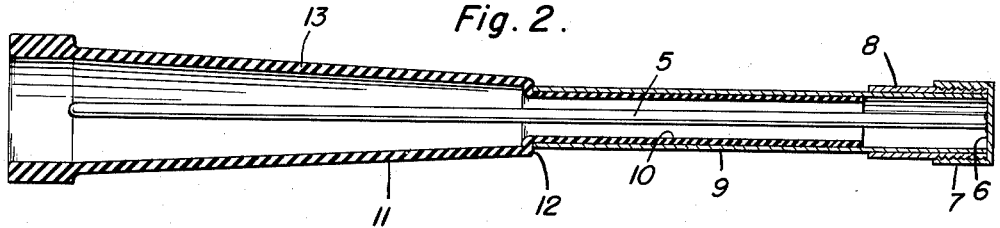
Figure 2 is a longitudinal sectional view showing the tool inserted in the narrow end of a teat cup prior to turning the latter inside out.
Figure 3:
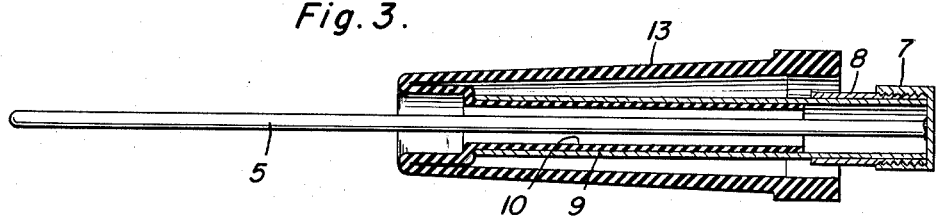
Figure 3 is a similar view showing the cup reversed for inspecting the interior thereof.

In the use of the invention the narrow end 10 of a teat cup 11 is inserted in tube 9, in the manner as shown in Figure 2 in the drawing, and with the outer end of tube 9 abutting the shoulder 12 formed between the narrow inner portion 10 and the outer flared portion 13 of the cup. The flared or wider end portion 13 of the cup may then be turned inside out, or reversed, in the manner as shown in Figure 3 of the drawing, to thus enable inspection of the interior of the wider portion of the cup.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What is claimed as new is as follows:

1. In a teat cup turning tool comprising a handle rod, a tube surrounding the rod at one end for receiving one end of a teat cup in the tube while the rod extends into the cup, and means rigidly connecting the tube to said end of the rod with the tube spaced concentrically of the rod and the rod extending at its other end out of the tube.

2. A teat cup turning tool comprising a handle rod, a tube surrounding the rod at one end for receiving one end of a teat cup in the tube while the rod extends into the cup, and means at said one end of the rod rigidly connecting one end of the tube thereto with the tube spaced concentrically of the rod.

3. A teat cup turning tool comprising a handle rod, a tube surrounding one end of the rod in spaced relation therefrom, said rod being inserted in one end of a cup while the tube is positioned externally thereof for turning the other end of the cup onto the tube, and a closure at one end of the tube to which the rod is rigidly attached to hold the rod centrally in the tube.

References Cited in the file of this patent
UNITED STATES PATENTS 2,672,063     Gaver _____ Mar. 16, 1954